United States Patent
Muneta et al.

(10) Patent No.: US 7,050,860 B2
(45) Date of Patent: May 23, 2006

(54) SAFETY NETWORK SYSTEM, SAFETY SLAVE, AND COMMUNICATION METHOD

(75) Inventors: Yasuo Muneta, Kyoto (JP); Toshiyuki Nakamura, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/481,515

(22) PCT Filed: Jun. 21, 2002

(86) PCT No.: PCT/JP02/06243

§ 371 (c)(1),
(2), (4) Date: Jun. 7, 2004

(87) PCT Pub. No.: WO03/001307

PCT Pub. Date: Jan. 3, 2003

(65) Prior Publication Data

US 2004/0210323 A1  Oct. 21, 2004

(30) Foreign Application Priority Data

Jun. 22, 2001 (JP) ............................ 2001-190419

(51) Int. Cl.
*G05B 19/18* (2006.01)

(52) U.S. Cl. .................... 700/3; 700/2; 700/5; 700/21; 700/79; 700/80; 709/208; 709/209; 709/210; 709/211; 710/110

(58) Field of Classification Search ................ 700/2, 700/3, 5, 21, 79, 80, 81, 82; 709/208, 209, 709/210, 211; 710/110

See application file for complete search history.

(56) References Cited

U.S. PATENT DOCUMENTS

| | | | | |
|---|---|---|---|---|
| 4,625,308 A | * | 11/1986 | Kim et al. | 370/321 |
| 4,715,031 A | * | 12/1987 | Crawford et al. | 370/462 |
| 4,750,171 A | * | 6/1988 | Kedar et al. | 370/445 |
| 5,218,680 A | * | 6/1993 | Farrell et al. | 709/215 |
| 5,400,018 A | | 3/1995 | Scholl et al. | |
| 5,732,094 A | * | 3/1998 | Petersen et al. | 714/805 |
| 5,850,338 A | * | 12/1998 | Fujishima | 700/3 |
| 5,907,689 A | * | 5/1999 | Tavallaei et al. | 710/110 |
| H1882 H | * | 10/2000 | Asthana et al. | 370/503 |
| 6,389,480 B1 | * | 5/2002 | Kotzur et al. | 709/249 |
| 6,574,234 B1 | * | 6/2003 | Myer et al. | 370/462 |
| 6,640,268 B1 | | 10/2003 | Kumar | |
| 2002/0082060 A1 | | 6/2002 | Kang et al. | |
| 2003/0037170 A1 | * | 2/2003 | Zeller et al. | 709/253 |
| 2003/0148760 A1 | | 8/2003 | Takayanagi | |

(Continued)

FOREIGN PATENT DOCUMENTS

EP     0905594 A1    3/1999

(Continued)

*Primary Examiner*—Ramesh Patel
(74) *Attorney, Agent, or Firm*—Foley & Lardner LLP (57) ABSTRACT

The safe PLC1 and the safe slaves 2 are connected with each other via the safe network 3. The safe PLC has the function of transmitting a request of safety information by broadcast message to the safe slaves. The safe slaves are each provided with a safety information transmission function for transmitting safety information indicative of whether the safe slave is in a safe condition or not; and a changing function for changing a priority of a transmission frame which carries the safety information. As a result, when the safe slaves send back safe responses at once in response to the broadcast message, safety information (danger) with a higher priority is transmitted ahead of others to the safe PLC.

8 Claims, 6 Drawing Sheets

U.S. PATENT DOCUMENTS

| | | |
|---|---|---|
| 2004/0018817 A1 | 1/2004 | Kanayama |
| 2004/0125821 A1* | 7/2004 | Kuhl .................... 370/503 |
| 2004/0181296 A1 | 9/2004 | Muneta et al. |
| 2004/0210326 A1 | 10/2004 | Muneta |
| 2004/0210620 A1 | 10/2004 | Muneta |
| 2004/0215354 A1 | 10/2004 | Nakayama |
| 2005/0017875 A1 | 1/2005 | Nakayama |

FOREIGN PATENT DOCUMENTS

| | | |
|---|---|---|
| GB | 2267984 A | 12/1993 |
| GB | 2307068 A | 5/1997 |
| JP | 60-062482 | 4/1985 |
| JP | 03-116395 A | 5/1991 |
| JP | 04-045697 A | 2/1992 |
| JP | 05-37980 A | 2/1993 |
| JP | 6-324719 A | 11/1994 |
| JP | 7-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO 02/098065 A1 | 12/2002 |

* cited by examiner

| Header part | Address part | Data part |
|---|---|---|

(b)

| Priority sequence 1 (high) | 0 | 0 | Response level when a danger has been detected |
|---|---|---|---|
| Priority sequence 2 | 0 | 1 | Response level in the safe condition |
| Priority sequence 3 | 1 | 0 | A request level of the master |
| Priority sequence 4 (low) | 1 | 1 | Communication with a low time control management (Ex. message) |

SAFETY NETWORK SYSTEM, SAFETY SLAVE, AND COMMUNICATION METHOD

This application is a National Stage application of PCT/JP02/06243, filed Jun. 21, 2002, which claims priority from Japanese patent application 2001-190419, filed Jun. 22, 2001. The entire contents of each of the aforementioned applications are incorporated herein by reference.

TECHNICAL FIELD

The present invention relates to a safe network system, safe slaves, and a communication method.

BACKGROUND ART

A programmable controller (hereinafter referred to as PLC) used in factory automation (hereinafter referred to as FA) performs its control function by entering ON/OFF information from input devices such as switches and sensors; executing logical calculation along a sequence program (also referred to as a user program) written in latter language; and outputting ON/OFF information signals to output devices such as relays, valves, and actuators in accordance with the obtained calculation results.

In some cases, the input and output devices are directly connected with the PLC, and in other cases, these devices are connected via a network. In a network system established with this network, the ON/OFF information are transmitted and received via the network. In this case, information is exchanged by a master-slave system where the PLC is the master and the devices are slaves.

On the other hand, a fail-safe system has been recently introduced into the control by a PLC. In this fail-safe system the network have a safety function therein, not to mention the PLC and devices. The term "safety function" indicates the function of verifying safety and performing an output. A safe system indicates that if the network system causes a dangerous condition, for example, an emergency shutdown switch is pushed or a light curtain or another sensor detects entry of a person (part of the body), fail-safe works and the system is shifted to the safe side to stop the operation. In other words, the system allows an output and machine operation only when the safety function verifies safety. If safety is not verified, the machines come to a stop.

Some of facility systems are equipped with production robots, pressure press machines and cutting machines, which are operated by men. In such a workplace there is a fear of dangerous accidents, such as the arm of a production robot touches a man's body, the pressure of a pressure press machine is applied on a part of a man's body, or the blade of a cutting machine touches a man's body. In an attempt to prevent such accidents, if there is a dangerous condition, the facility system brings the operation of the facility into a standstill (stops the operations of the production robots, pressure press machines and cutting machines). In some cases these machines are not brought to a full stop, but their operations are slowed down enough not to cause a danger to a person by reducing the moving speed of the arm of the production robot or decreasing the pressure of the pressure press machine. Thus, the safe system controls keeping the facility system out of a dangerous condition.

Figure 1:
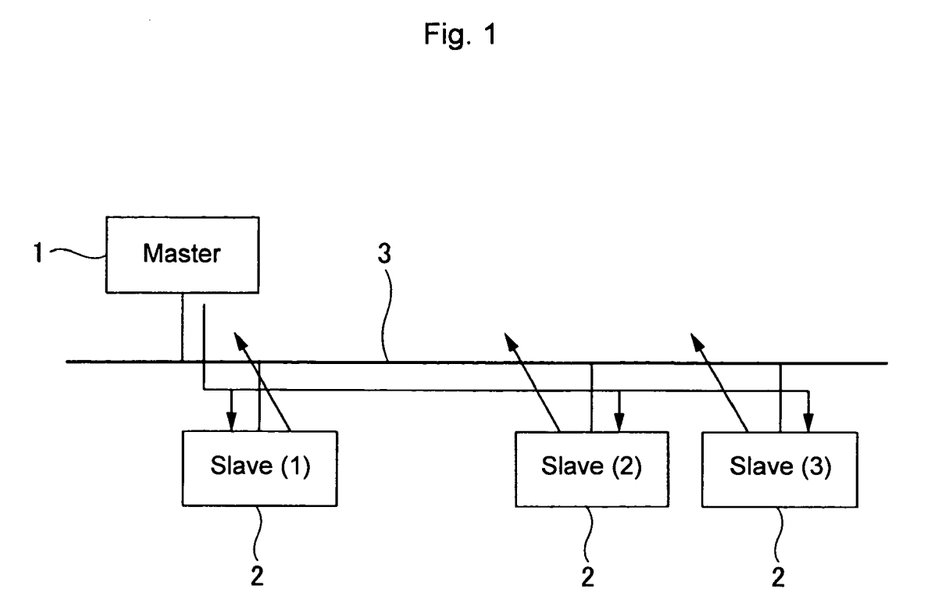
FIG. 1 shows a diagram of a preferable embodiment of the safe network system of the present invention.

In the network system equipped with the aforementioned safety function (safe network system), it is necessary to fix a maximum response time elapsed between the occurrence of an abnormal or dangerous condition and the execution of a safety operation (stopping of the operation of a device, for example). To be more specific, as is well known, in the case where information is transmitted by the master-slave system, as shown in FIG. 1(a), when there is a request from the master, the slaves in turn send back a safety response. In this example, the network system has three slaves. The ON/OFF information to be treated in this case is I/O information for safe control, which indicates to be normal (safe)/abnormal (dangerous). As the maximum response time, the time required for one communication cycle is secured.

According to the specific procedure of data transmission and reception between the safe PLC and the safe slaves, the safe PLC makes a request to one of the safe slaves connected with the safe network, and the safe slave received the request sends back safety information. For example, when there are three safe slaves ① to ③, the safe PLC can make a request to the safe slaves ①, ②, and ③ in this order to collect safety information from the three safe slaves in the same order.

Since the sequence of sending back a safety response from the safe slaves is fixed in one communication cycle, the safety response from the safe slave ① is transmitted comparatively quickly to the safe PLC, whereas the safety response from the safe slave ③, which is the last in one communication cycle, is transmitted late.

As the number of slaves (nodes) to be connected increases, the time for one communication cycle gets longer. The result is that the aforementioned maximum response time becomes longer. Consequently, in the same communication cycle, the data to be received first and the data to be received last have a larger time difference. Hence, when a safe system is designed, the maximum response time must always be taken into consideration.

On the other hand, when a danger (a failure or a dangerous factor) has actually been detected, it is ideal to perform safe control (output interruption) as soon as possible. To be more specific, when the safe system is designed by taking the maximum response time into consideration, if information about an abnormality (danger) can be reported early in one communication cycle, the time elapsed between the report and the maximum response time becomes longer (safe margin becomes larger), so as to carry out the safety function more securely and to make fail-safe work with a sufficient amount of time, thereby shifting the system to the safe side and stopping the operation.

However, the communication inside the network is under the control of the PLC side which is the master, so it has been impossible for the conventional system to make the slave which has detected a danger transmit safety information early in one communication cycle. In other words, the PLC cannot know there is a slave in an abnormal (dangerous) condition until it receives safety information (the presence of a danger) from all the slaves. Therefore, all it can do is to acquire safety information from the slaves in turn in accordance with the predetermined rule (the sequence of node addresses, for example).

This invention has an object of providing a safe network system, safe slaves, and a communication method which can inform the master (controller) and other devices of the occurrence of an abnormality (a danger) detected by a safe slave or the like as soon as possible.

DISCLOSURE OF THE INVENTION

The safe network system of the present invention is composed of a safe controller and safe slaves which are connected with each other via a safe network. The safe controller has the function of transmitting a request for safety information by broadcast message to the safe slaves. The safe slaves are each provided with a safety information transmission function for transmitting safety information indicative of whether it is in a safe condition or not, and a changing means for changing the priority of a transmission frame which carries the safety information. The changing means is designed so as to set the priority higher when the safe slave is not in a safe condition than when it is in a safe condition.

The term "set the priority high" means that the priority becomes higher when the slave is in a dangerous condition than in a safe condition. To be more specific, it is possible to raise the priority when the safe slave is not in a safe condition by using the safe condition as the reference, or to lower the priority when the safe slave is in the safe condition by using an unsafe condition as the reference. In the latter case, the priority becomes higher when the safe slave is not in a safe condition, making it possible to transmit its safety information earlier than the safety information of the other safe slaves as will be described below.

The safe slave of the present invention is a safe slave to be connected with a safe network system which is composed of a safe controller and safe slaves connected with each other via a safe network, and is provided with a safety information transmission function for transmitting safety information indicative of whether the safe slave is in a safe condition or not; and a changing means for changing the priority of a transmission frame which carries the safety information, the changing means setting the priority higher when the safe slave is not in the safe condition than when the safe slave is in the safe condition.

The communication method of the present invention is a communication method in a safe network system composed of a safe controller and safe slaves which care connected with each other via a safe network. The safe controller provides the safe slaves connected with the safe network a transmission request for safety information by broadcast message at a prescribed timing. Then, the safe slave received the transmission request transmits safety information indicative of whether or not the safe slave is in a safe condition as a response to the transmission request. In this case, the priority is changed according to the contents of the safety information to be transmitted.

The safety information is information for the fail-safe control of the system. One example of the safety information is information indicative of whether a safety device connected to the safe slave is in a safe condition or not (whether or not the emergency shutdown button has been pushed, whether or not entry of a man into a dangerous zone has been detected, or the like). Another example is information indicative of whether the safe slave or the safety device itself is in a safe condition or not (whether the safe slave has a failure or abnormality, or whether the safety device has a failure or abnormality, or the like) Further another example is information indicative of whether the network is in the safe condition or not (whether or not there is an error in the network communication due to noise or there is a communication abnormality due to network interruption).

The term "safety function" indicates a so-called fail-safety function, which is a system to produce an output and to operate the machine provided that the system is in a safe condition. When the system is not in the safe condition, the output is stopped. When an abnormality occurs in the control of the controller or there is a communication abnormality, the control is shutdown and the operation of the controller is stopped so as to keep the devices for output and the control devices in a safe condition.

This control shutdown is required, for example, in the following dangerous conditions: when the CPU and other processing parts of the controller are doubled in number and a disagreement between them has been detected; when the network has an abnormality due to some reason; when the emergency shutdown switch of the machine system has been pushed; and when entry of a man (or part of the body) into the dangerous region has been detected by a multi-optical axis photoelectric sensor such as a light curtain. In these cases, the safety function secures the safe operation of the machine system which is the control target; brings the operation into a stop under the safe condition in addition to this operation; or makes fail-safe work so that the operation of the machine system is forcibly stopped in the safe condition.

In this invention, when the safe slave transmits safety information (safe/abnormal (dangerous) or the like) in response to the request from the safe controller, the priority is set according to the contents of the safety information. Therefore, the transmission frame indicative of the occurrence of an abnormality (danger) is assigned a higher priority and is transmitted to the safe controller earlier than the other transmission frames indicative of safety information (safety) of the other safe slaves. In short, the safety information with the higher priority is transmitted early in one communication cycle. Hence, when the safe slave or another device has detected an abnormality (danger), it can be reported to the master (safe controller) as soon as possible.

Thus, the present invention has a feature that in the transmission of transmission frames of the same kind such as a safety response, the priority is changed with changing external factors such as the detection of an abnormality (danger). A system (communication protocol) for transmitting a transmission frame with a higher priority earlier than the other transmission frames provided with priority information can be realized by various kinds of conventional algorism.

The safe controller of the present invention, as will be described in the embodiment, includes not only PLC (master), but also a configuration tool, a monitoring tool, a monitor device and the like, which are connected with the safe network.

BRIEF DESCRIPTION OF THE DRAWINGS

FIG. 5(*a*) shows a diagram of an example of the data configuration of the transmission frame, and FIG. 5(*b*) shows a diagram of an example of priority information (the sequence of transmission).

FIGS. 7(*a*) and 7(*b*) show a diagram explaining the effects.

FIGS. 8(*a*) and 8(*b*) show a diagram explaining the effects.

BEST MODE FOR CARRYING OUT THE INVENTION

The present invention will be described in detail as follows with reference to the appended drawings.

FIG. 1 shows an example of the safe network system to which the present invention is applied. As shown in this drawing, a safe PLC1 (master) and a plurality of safe slaves 2 are connected with each other via a safe network (field bus) 3. The safe PLC1 and the safe slaves 2 exchange information by the master-slave system. Furthermore, each of the safe slaves 2 is connected with safety devices 4 including various kinds of input and output devices, in addition to safe door switches, safe limit switches, emergency shutdown switches and the like. The safe PLC1 is composed of a plurality of units connected with each other, such as a CPU unit, a master unit (communication unit) and an I/O unit. In this case, the safe network unit 3 is connected with a master unit.

All the devices composing this safe network system have a safety function (fail-safe) contained therein. This safety function verifies safety and produces an output (control). In a dangerous condition, fail-safe works to shift the system on the safe side, thereby stopping the operation. To be more specific, the safe system enables fail-safe to work so as to shift the system on the safe side, thereby stopping the operation when the network system is put in a dangerous condition, such as when the emergency shutdown switch of the machine system has been pushed or when a light curtain or another sensor has detected entry of a man (or part of the body) into the dangerous region. In other words, the safe system produces an output and operates the machines only when the safety function verifies safety. Therefore, if safety is not verified, the machines come to a stop.

Next, of these safety functions, the transmission and reception of information which is the main part of the present invention will be described as follows. The safe PLC1 has communication facility built therein so as to perform the exchange of information with the safe slaves 2 by the master-slave system. Basically in the same manner as the conventional system, the safe PLC1 makes a request to one of the safe slaves 2 via the safe network 3, and the safe slave 2 received the request sends back safety information as a safety response.

In the present invention, the request from the safe PLC1 is a broadcast message, and the safe slaves 2 connected with the safe network 3 can response to the safe PLC1 at the same time (it goes without saying that the safe PLC1 actually receives the safety response from one safe slave 2 at a time). To be more specific, the system is provided with the function of performing the operation shown in the flowchart of FIG. 2.

Figure 2:
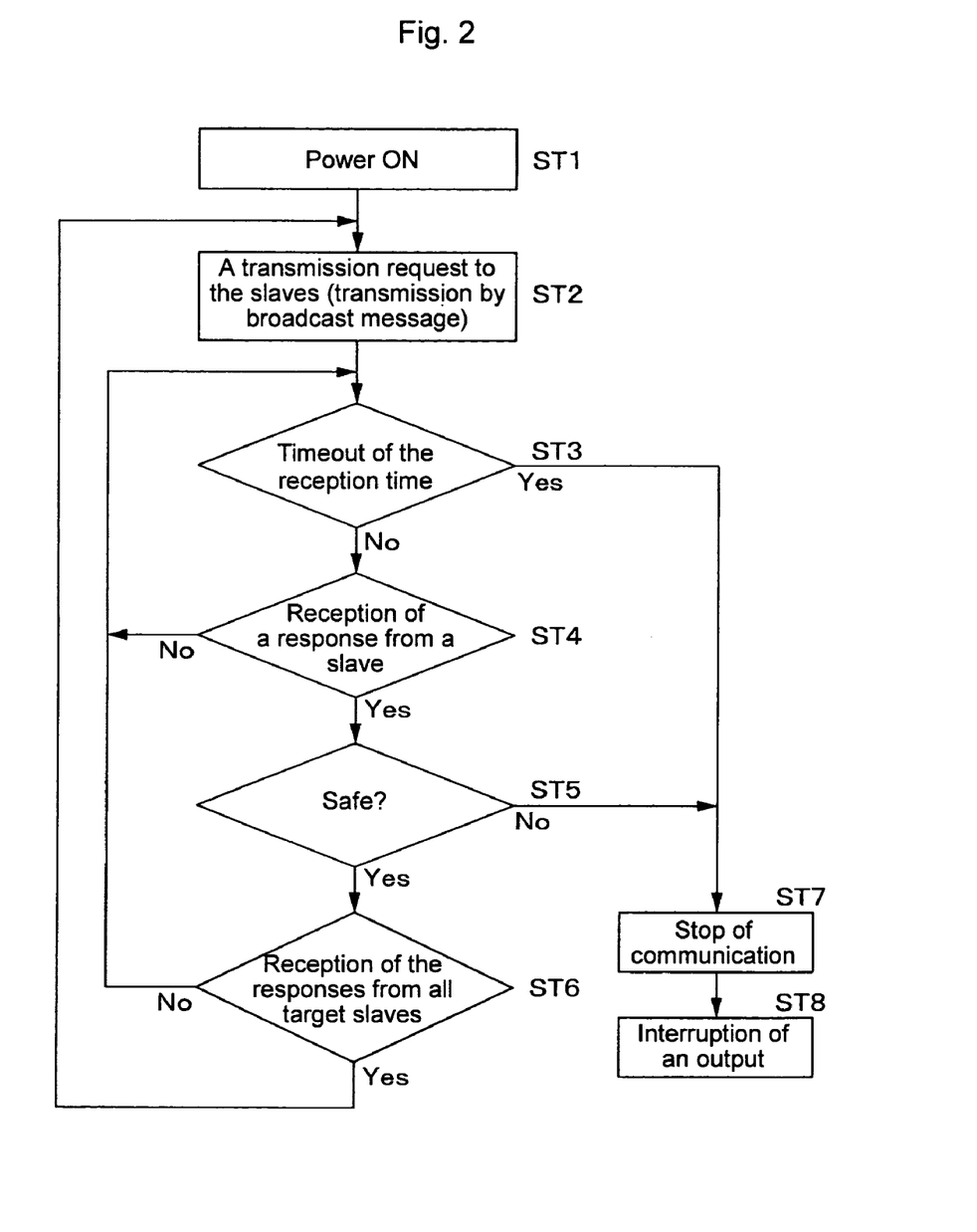
FIG. 2 shows a flowchart depicting the functions of the safe PLC (master).

When the power is turned on, the safe PLC1 makes a transmission request by a broadcast message to the safe slaves at the prescribed timing (ST1, ST2). Later, the safe PLC1 waits for a response to come from the slaves until the timeout of the reception time (ST3, ST4). The timeout of the reception time occurs when the time which is set as one communication cycle time has elapsed after a transmission is requested.

As will be described later, when responses from all target slaves have not been received before the timeout of the reception time, it is concluded that there has been an abnormality on the network, so the flow jumps to step 7 to stop the communication process and to interrupt the output (ST8). In short, a fail-safe process in the ordinary abnormality time is executed. In the example of this flowchart, it is designed that communication stops immediately when there is a safe slave that fails to give a response. Instead, by taking one time margin, when there is a safe slave that fails to give a response two times on end, it is regarded as an abnormality and the communication is stopped.

On the other hand, when there is a response from a safe slave (Yes in the branch determination of Step 4), the flow goes to step 5 to determine whether the contents of the safety response (received safety information) indicate a safe condition or not. When there is an abnormality (danger), the flow goes to step 7 to stop the communication and to execute an output interruption process in the same manner as when the timeout of the reception time is received (ST7, ST8).

When the received contents indicate a safe condition, it is determined whether the responses from the target slaves, that is, all the safe slaves 2 connected with the safe network 3 have been received or not (ST6). Needless to say, for this determination, the process of storing the numbers of the safe slaves from which safety responses have been received is performed. When there is a safe slave from which a safety response has not been received, the flow goes back to step 3 to wait for the reception of a next safe slave. When responses have been received from all the safe slaves, the communication cycle this time is complete, and the flow goes back to step 2 where transmission is requested to the safe slaves by broadcast message for the next communication cycle. Hereafter the aforementioned processes are repeated.

On the other hand, the safe slave 2 transmits a transmission frame (safety response) equipped with a priority of transmission, and is provided with a changing function for changing the priority of the transmission frame. This changing function makes a safety response in a safe condition which is the normal condition have a low priority of transmission, and raises the priority of transmission only when the safe slave 2 (the safety device connected to it) has detected the presence of a danger.

According to the communication protocol, as will be described later, a transmission frame with a high priority can be transmitted on the safe network 3 ahead of others so as to reach the safe PLC1 quickly. The result is a reduction in the response time when the presence of a danger has been detected.

Figure 3:
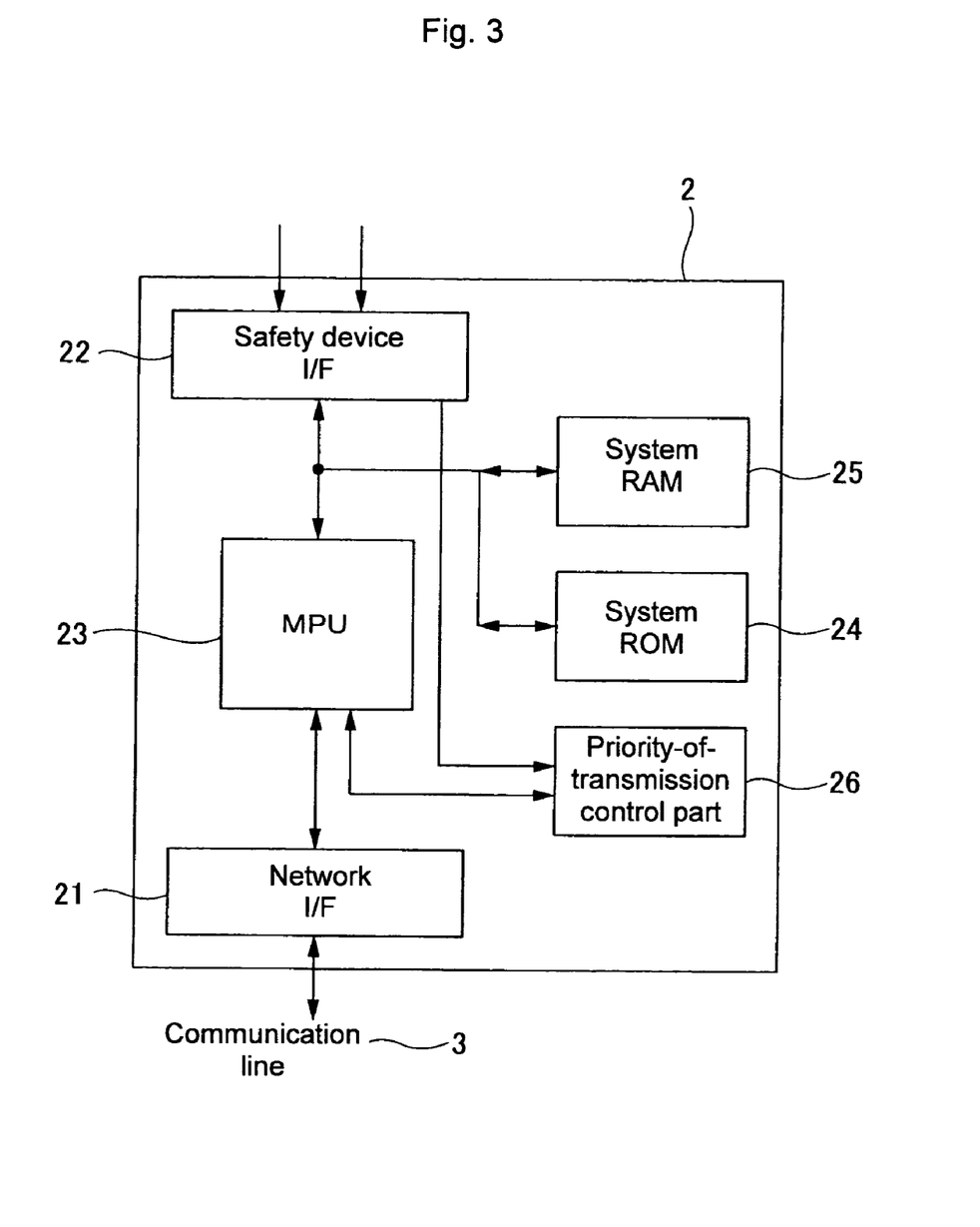
FIG. 3 shows a diagram of a preferable embodiment of the safe slave of the present invention.

The safe slave 2 has an internal structure shown in FIG. 3 to achieve the aforementioned processes. As shown in FIG. 3, the safe slave 2 is composed of a network interface 21 which is connected with the safe network 3 and exchanges data with the safe PLC1 (master); a safety device interface 22 which exchanges data with the safety device (not illustrated) connected with the safe slave 2; and an MPU 23 which reads out programs stored in a system ROM 24, and executes a prescribed process by using a memory region of a system RAM 25 when necessary. The MPU 23 performs the process of sending back the safety information (safe/dangerous) acquired from the safety device via the safety device interface 22 in response to a request from the master received via the network interface 21 to a master unit 1b via the network interface 21 and the safe network 3.

It is possible that the safe slave 2 itself can be the safety device, and in that case the safety device interface 22 becomes a safety device part for detecting whether it is safe or not. The aforementioned configuration and theory of operation of the safe slave 2 are not explained in detail here because they are the same as conventional devices.

In the present invention, the safe slave 2 has a priority-of-transmission control part 26 which provides the transmission frame carrying safety information with priority information. The priority-of-transmission control part 26 sets an abnormality flag on detecting the presence of an abnormality (danger) from the IO information of the safety device interface 22. The detection of a danger includes the cases that the emergency shutdown button has been pushed or entry of a man into a dangerous area has been detected.

Figure 4:
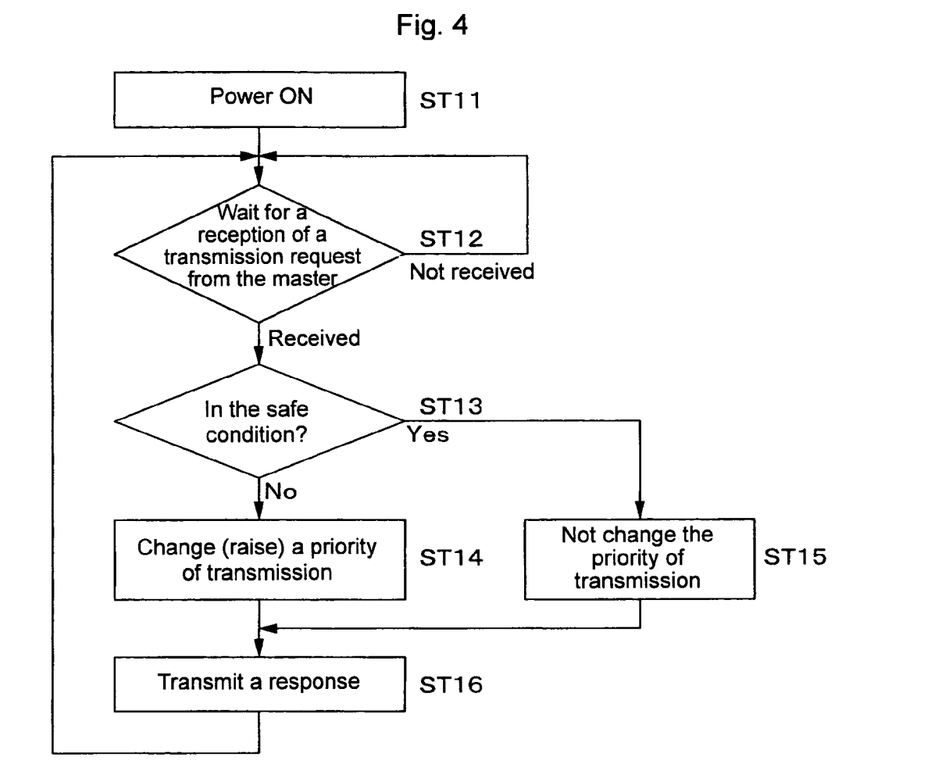
FIG. 4 shows a flowchart depicting the functions of the MPU of the safe slave.

The MPU 23 generates and outputs a transmission frame with a raised priority when the abnormality flag is on. The processing function of the MPU 23 in the present invention is shown in the flowchart of FIG. 4. To be more specific, after the power is turned on, a request to be sent from the safe PLC (master) is waited for (ST12), and when the request has been received, it is determined whether the safe slave 2 is currently in a safe condition or not (ST 13). When it is not in the safe condition, the priority of transmission is raised (ST14), and safety information (dangerous) containing the information of the high priority is transmitted (ST16). On the other hand, when it is in the safe condition, the priority of transmission is not changed (ST15), and safety information (safe) containing low priority information is transmitted (ST16). The aforementioned processes are repeated until the system comes to a stop.

Thus, in the present embodiment, the priority assigned to the same kind of transmission frames indicating safety response (safety information) is changed based on the presence or absence of an abnormality resulting from external reasons such as the pushing of the emergency shutdown button or the detection of entry of a man into a dangerous area, the presence of absence of an abnormality resulting from internal reasons such as a failure or an abnormality of the safe slave itself and the safety device.

Figure 5:
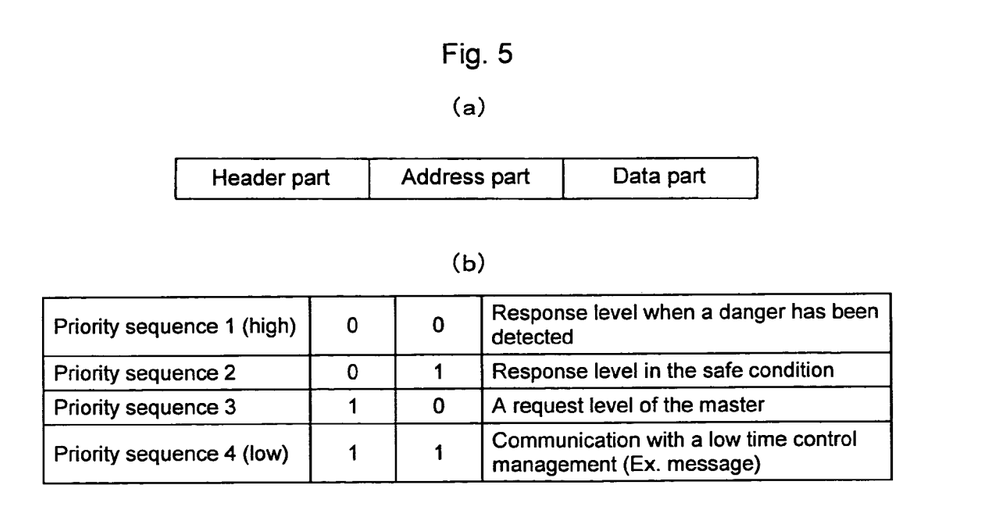

The following is a description about how a transmission frame with a high priority is transmitted earlier than the other transmission frames to the safe PLC1 as the master by outputting a transmission frame containing the priority information. First, as shown in FIG. 5(*a*), the transmission frame is composed of header information, addresses, and data to be transmitted. The head of the header information contains 2-bit priority information (priorities for transmission). As shown in FIG. 5(*b*), "00" is in first place, which has the highest priority. This is followed by "01" in second place; "10" in third place; and "11" in fourth place, which has the lowest priority. In the present embodiment, the first place and the second place are switched according to the contents of safety information.

The address part stores a receiver's address and a transmitter's address. The data part stores safety information. The safety information includes the distinction between safety and an abnormality (danger), or the contents of an abnormality, if any. When the contents of such an abnormality are spontaneously transmitted from the safe slave, it is preferable to transmit it in the fourth place.

On the other hand, the transmission and reception of data on the safe network 3 by the network interface 21 and communication protocol are based on CAN (Controller Area Network). As is well known, in CAN, priorities are managed by the data link layer, and when the data on the communication line are wired ORed, and data "1" and data "0" are overlapped, data "0" appear on the line.

Figure 6:
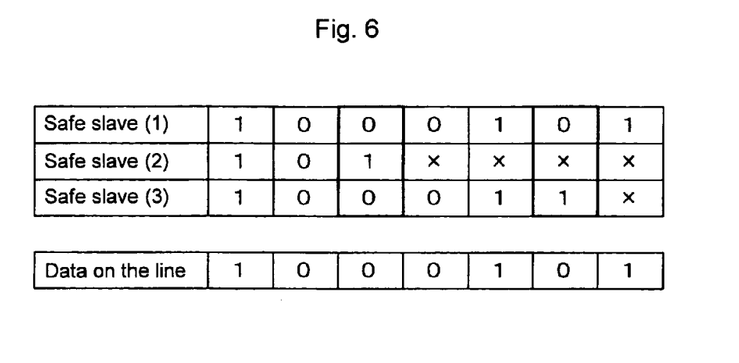
FIG. 6 shows a diagram of the theory of operation of transmitting a transmission frame with a higher priority ahead of others.

Assume that three safe slaves concurrently transmit the data shown in FIG. 6 onto the safe network 3. To be more specific, assume that the transmission frame of the safe slave ① is "1000101 . . . ", the transmission frame of the safe slave ② is "101 . . . ", the transmission frame of the safe slave ③ is "100011 . . . ". In this case, the data on the line (on the safe network 3) are wired ORed to become "1000101 . . . " as shown in the drawing.

In this case, each safe slave 2 transmits their transmission frame (safety information), monitors the data on the line to determine whether the data on the line agree with the data that they have transmitted. When these data do not agree, each safe slave determines that they are not authorized for transmission this time and stops the transmission of the subsequent data. For example, in FIG. 6 the third bit of the data on the line is "0" different from the third bit of the data of the safe slave ② which is "1". Therefore, the safe slave ② stops the transmission of the fourth and the subsequent bits of the data, and only the safe slaves ① and ② keep transmitting the fourth and the subsequent bits of data. The sixth bit of the data on the line is "0" different from the sixth bit of the data of the safe slave ③ which is "1". Therefore, the safe slave ② stops the transmission of the seventh and the subsequent bits of the data. Hereafter, the safe slave ① exclusively transmits data, and the safe PLC 1 receives a response from the safe slave ①.

When the transmission from the safe slave ① is thus complete, no communication is carried out on the line, so the safe slaves ② and ③ which have not finished data transmission restart the transmission of data (the safe slave which has finished the transmission of a safety response does not perform transmission until the next request arrives). In this retransmission, too, according to the same principle as described above, one of the safe slaves completes data transmission, making it possible that the safety response from this safe slave is received by the safe PLC.

Through the repetition of such processes, all the safe slaves 2 can transmit safety responses within one communication cycle. As for the sequence of communication, if all the safe slaves have the same priority of transmission, the leading two bits are the same and the receiver's address is also identical; however, the transmitters' addresses are different. Therefore, the transmission of safety responses by the nodes is performed in descending order of transmitters' addresses.

On the other hand, when a safe slave 2 suffers an abnormality (danger) and the priority information becomes "00", the other safe slaves 2 in the safe condition have transmission frames whose priority information is "01", so these safe slaves in the safe condition do not transmit the third and the subsequent bits of data because the second bit of the priority information is different from the data on the line. As a result, the safety response from the safe slave 2 in the abnormal condition can be transmitted to the safe PLC1 ahead of others.

Figure 7:
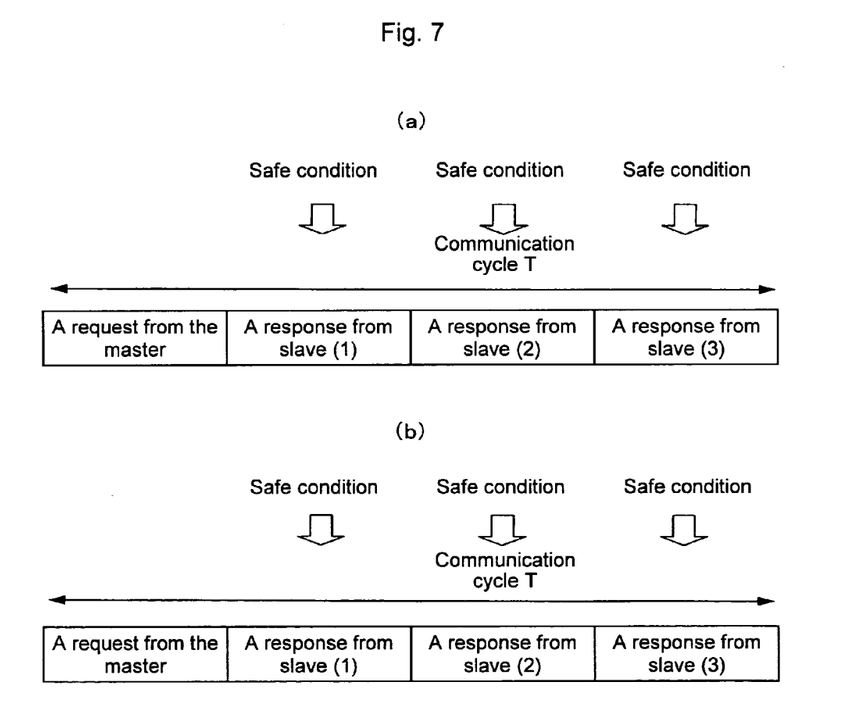

Therefore, when the safe slaves are all in the safe condition, as shown in FIG. 7(*a*), the transmission frames whose priority information can be changed as in the present invention and the conventional transmission frames (the sequence of transmission is ①, ②, and ③) whose priority information cannot be changed as shown in FIG. 7(*b*) are transmitted in the same sequence.

Figure 8:
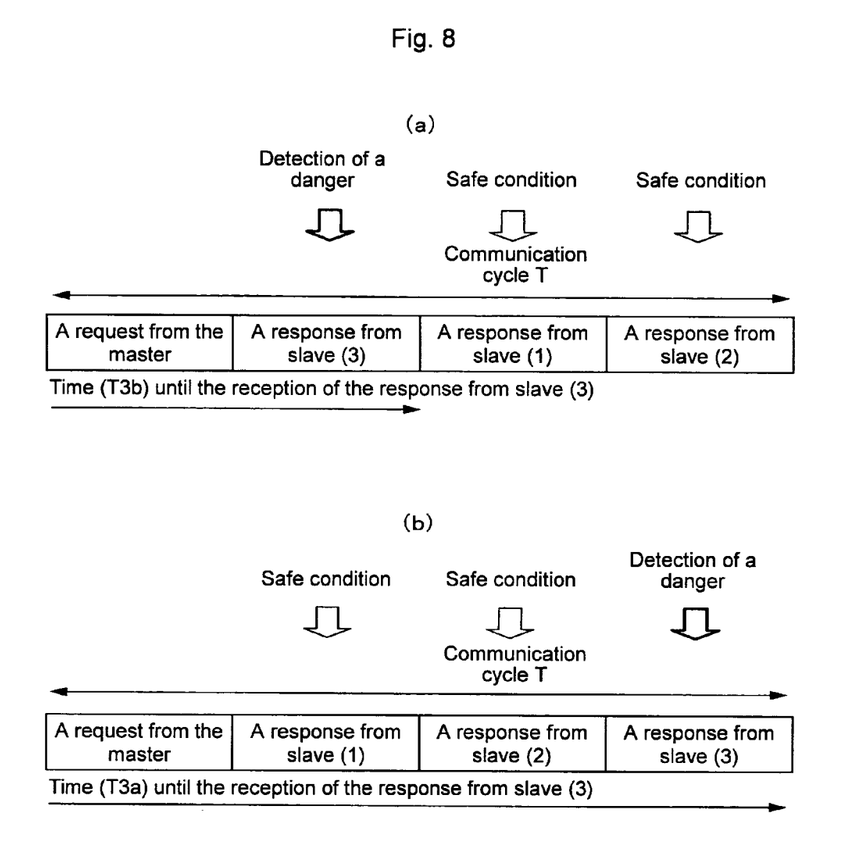

On the other hand, when a danger has been detected (the occurrence of an abnormality) from the safe slave ③, in the conventional case, the sequence of transmission is ①, ②, and ③ as shown in FIG. 8(*b*), so it takes a time T3*a* until a response from the safe slave ③ is received (master request time+the transmission time of three safe slaves). Whereas in the present invention, as shown in FIG. 8(*a*), the safe slave ③, which has a transmission frame with the highest priority, can perform transmission ahead of others. Therefore, the time (T3*b*) until the response from the safe slave ③ is received becomes (master request time+the transmission time of one safe slave), which is very short.

In this manner, the response of the safe slave from which a danger has been detected is transmitted ahead of others, so in the safety interruption part (safety monitor or master), the data from the safe slave from which a danger has been detected can be received ahead of others, thereby speeding up the safety operation. As a result, in the condition where the safe system is working properly, the effective response time of the system to be operated inherently when a dangerous factor has been detected is speeded up.

As for the relation between the transmission frame shown in FIG. 6 and the diagram of FIG. 5, the first bit in FIG. 6 is a fixed bit, and all transmission frames have "1". The second and third bits are the region to store the flag of priorities, and the first to third bits in addition to the fixed bit correspond to the header part shown in FIG. 5.

Since the address part is composed of 4 bits (in the case where it corresponds to 16 safe slaves at the maximum), FIG. 6 shows the specific values of the header part and the address part of the transmission frame shown in FIG. 5, and actually, the bits composing the data part are present in the eighth and the subsequent bits.

Therefore, the case with the transmission frames shown in FIG. 6 indicates that the safe slaves ① and ③ have detected a danger, and when there is a plurality of transmission frames with a high priority as in this case, the transmission frame having a smaller transmitter's address (safe slave ①) is transmitted first. To be more specific, in the example shown in FIG. 6, the safe slaves ①, ③, and ② actually transmit transmission frames in this order.

As shown in FIG. 5(*b*), the sequence of transmission: 3rd and 4th having a lower level of priority information than the safety response can be set, and transmission frames having such a sequence of transmission can be generated as necessary so as to transmit safety information ahead of other information assigned a low priority in one communication cycle time.

Although the safe controller explained in the aforementioned embodiment is a PLC (master), the safe controller of the present invention is not restricted to this and contains a device for collecting and monitoring information such as a configuration tool or a monitoring device.

The aforementioned embodiment shows an example where the slaves exchange I/O information with the master unit, and exchange the I/O information with the controller (PLC) via the master unit. The master unit and the slaves are in the master-slave relation where the appropriate slave sends back a response to the request from the master. However, the slave referred to in the present invention is not restricted to those that perform master-slave communication. In short, although it is referred to as the slave, it can use an arbitrary communication system. In this aspect, strictly speaking, the slave of the present invention includes a different concept from the slave generally defined.

The request from the safe controller is based on the command that the slave has received via the safe network, and that is generated outside the slave. Some examples of such a request are, in addition to an information request command from the master to the slave as explained in the embodiment, an information request command from the monitoring device (monitoring tool) to the slave, an information request command from a configurator (configuration tool), and a command which is transmitted from a tool via the PLC or the master.

INDUSTRIAL APPLICABILITY

According to the present invention, when there is an abnormality (when a danger has been detected), safety information is transmitted by a transmission frame having a raised priority, so that when a safe slave or another device has detected an abnormality (danger), the abnormality can be reported to the safe controller as soon as possible.

What is claimed is:

1. A safety network system composed of a safety controller and safety slaves which are connected with each other via a safety network, wherein
the safety controller has a function of transmitting a request for safety information by broadcast message to the safety slaves;
the safety slaves each comprise:
a safety information transmission function for transmitting safety information indicative of whether the safety slave is in a safe condition or not, the safe condition indicative of an absence of one of a dangerous condition, a failure of the safety slave, or an abnormality of the safety slave; and
a changing means for changing a priority of a transmission frame which carries the safety information, the changing means setting the priority higher when the safety slave is not in the safe condition than when the safety slave is in the safe condition.

2. The safety network system of claim 1, wherein the safe condition is indicative of an absence of a dangerous condition.

3. A safety slave for being connected with a safety network system composed of a safety controller and safety slaves which are connected with each other via a safety network, the safety slave comprising:
a safety information transmission function for transmitting safety information indicative of whether the safety slave is in a safe condition or not, the safe condition indicative of an absence of one of a dangerous condition, a failure of the safety slave, or an abnormality of the safety slave; and
a changing means for changing a priority of a transmission frame which carries the safety information, the changing means setting the priority higher when the safety slave is not in the safe condition than when the safety slave is in the safe condition.

4. The safety slave of claim 3, wherein the safe condition is indicative of an absence of a dangerous condition.

5. A communication method in a safety network system composed of a safety controller and safety slaves which are connected with each other via a safety network, wherein
the safety controller makes a transmission request of safety information by broadcast message in a prescribed timing to the safety slaves connected with the safety network, and
a safety slave receiving the transmission request transmits the safety information indicative of whether the safety slave is in a safe condition or not in response to the transmission request by changing the priority of transmission in accordance with the contents of the safety information, the safe condition indicative of an absence of one of a dangerous condition, a failure of the safety slave, or an abnormality of the safety slave.

6. The communication method of claim 5, wherein the safe condition is indicative of an absence of a dangerous condition.

7. A safety network system composed of a safety controller and safety slaves which are connected with each other via a safety network, wherein the safety controller has a function of transmitting a request for safety information by broadcast message to the safety slaves;

the safety slaves each comprise:

a safety information transmission function for transmitting safety information indicative of whether the safety slave is in a safe condition or not, the safe condition indicative of an absence of one of a dangerous condition, a failure of the safety slave, or an abnormality of the safety slave; and a changing function which changes a priority of a transmission frame which carries the safety information, the changing function setting the priority higher when the safety slave is not in the safe condition than when the safety slave is in the safe condition.

8. The safety network system of claim 7, wherein the safe condition is indicative of an absence of a dangerous condition.

* * * * *